May 19, 1964     D. M. CRIPE     3,133,651
TELESCOPING POLE TRAILER
Filed Sept. 5, 1961
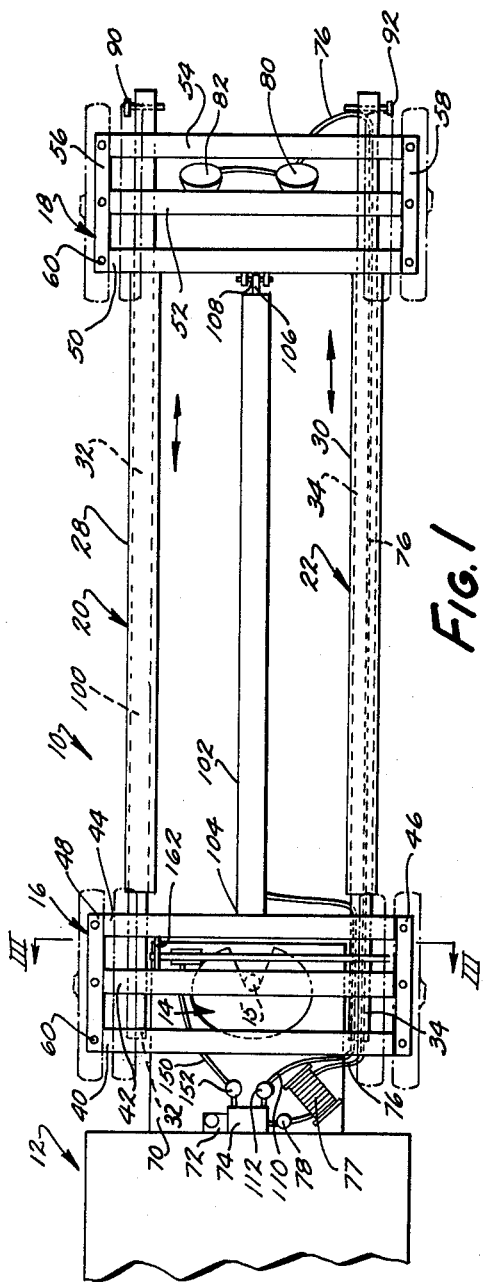
INVENTOR.
DONALD M. CRIPE
BY
ATTORNEYS United States Patent Office 3,133,651
Patented May 19, 1964

3,133,651
TELESCOPING POLE TRAILER
Donald M. Cripe, 1963 Maple Island Road,
Twin Lake, Mich.
Filed Sept. 5, 1961, Ser. No. 135,888
1 Claim. (Cl. 214—77)

This invention relates to truck trailers and more particularly to an extensible trailer especially useful for hauling poles and which is extensible, collapsible, and unloadable in a simple and rapid manner.

Hauling of poles and logs on trailers involves articles of great length. A rear trailer platform at least 50 feet behind the front trailer platform is normally necessary and very common. When a load of poles such as telephone poles has been hauled to the destination, it is extremely advantageous to be able to shorten the trailer at least half of its original length and thereby enable maneuvering of the truck while proceeding to pick up another load. Various types of extensible pole trailers have been devised heretofore in an attempt to accomplish this result. However, these have not been very satisfactory, with typical examples including a rigid central shaft extending to the rear of the trailer upon which a slidable dolly is mounted. Thus, even when the dolly is collapsed to the front of the trailer this pole extends up to about 50 feet to the rear of the truck to constitute a very substantial safety hazard. Another type involves pairs of telescoping tubes between the front and rear sections of the trailer. This latter type has not gained wide acceptance since it is very heavy and by its very nature is almost impossible to extend and retract by the driver of the truck. It requires considerable effort and manipulation to do so and consequently has not been too favorably received. A difficulty normally encountered with extensible trailers has been the lack of accurate control over the movable rear platform. This lack of control not only includes the extension and contraction thereof, but includes the simultaneous movement of brake lines, either electric or air, which extend to the rear platform. Thus, with present trailers, any brake lines or electrical tail-light lines extending to the rear platform are constantly subject to damage with extension and contraction of the rear platform, i.e. by contracting the platform the lines are caused to dangle beneath the truck and be subject to bruising or pinching.

As a consequence of these and related disadvantages, extensible pole trailers have been cumbersome and difficult to handle when utilized at all.

Consequently, there has existed a need in the art for a trailer which could be rapidly extended in an accurately controlled manner by just the driver in a simple and effortless manner, and in a matter of a few seconds. Thus, when the driver approaches the loading position the trailer can be quickly extended for loading. When he reaches his destination and unloads the poles it is just as quickly and simply contracted to enable him to utilize his time to the best advantage. The contracted trailer is thus readily maneuverable back to the original location.

It is an object of this invention to provide such an advantageous extensible trailer. The invention provides a trailer enabling rapid extension by only the driver without any special effort or additional help. Further, the pole trailer can be unloaded in a few seconds when the driver has reached his destination as contrasted to the time-consuming manual methods used heretofore. The extension, contraction, and unloading are preferably all operated from a central power means. The rear platform may be provided with air or electrical brakes to enable accurate control thereover. The air lines and/or electrical lines leading to the rear platform are not subject to damage, but are rather constantly and completely enclosed and protected in the unique telescoping pole structure. The trailer may be extended to at least half again its original length by virtue of the novel arrangement of the telescoping members.

These and other objects will be apparent from a study of the specification when read in conjunction with the drawings in which:

FIG. 1 is a plan view of the novel trailer attached to a truck cab;

FIG. 2 is a rear elevational view of the pole trailer;

FIG. 3 is a sectional view taken on plane III—III of FIG. 1 and illustrating the unloading mechanism forming part of this invention.

Basically, the invention comprises a rapidly adaptable pole trailer allowing effortless and rapid extension, unloading and contraction and including a front platform, a rear platform, and two sets of tubular telescoping, extensible elements between said platforms. One set of the telescopically interfitting tubular elements forms a conduit means whereby brake lines, and/or electrical lines may extend to the rear platform in a shielded, protected manner even during contraction and extension of the trailer. The two sets of elements comprise a pair of relatively large tubular elements affixed to the rear platform and extending toward the front, and a pair of relatively small tubular elements affixed to the front platform, extending rearwardly through the longer elements, and extending through the rear platform.

Secured between the front and rear platforms in one form of the invention is a fluid motor capable of extending the rear platform to approximately twice the length of the contracted position by operation of a control valve. This motor is operated by pressurized air from a compresser which also supplies air for brakes of the pole truck. Preferably, a third air line from the same compresser serves to operate a novel unloader means optionally located on the front platform. Thus, the plurality of lines extending to the rear brakes, the extension motor, and the motor means for the unloader are operated from a single compresser with each having its independent valve control.

Referring now to FIG. 1, the inventive pole truck comprises an extensible pole trailer 10 which may be connected to truck cab 12 by suitable connection means such as a fifth wheel assembly 14.

The extensible trailer 10 includes a pole-supporting front platform means 16, a pole-supporting rear platform means 18, and two sets of telescopic extensible means 20 and 22. The sets of telescoping means include outer tubular elements 28 and 30 secured to the rear platform 18 as by weldment or the like. Secured to the front platform and extending through the elements 28 and 30 are a pair of relatively smaller tubular elements 32 and 34, respectively. Elements 32 and 34 extend through the rear platform 18 to project to the rear thereof when the trailer is contracted.

The front platform 16 may be suitably composed of a plurality, here three, laterally placed, vertically oriented I beams 40, 42 and 44, with two longitudinally positioned I beams 46 and 48 on the respective ends thereof. Cylindrical elements 32 and 34 extend clear through the central web of the front I beam 40. The rear platform is likewise formed of three lateral I beams 50, 52 and 54, with two end I beams 56 and 58 suitably secured thereto as by weldment. The rear platform may be suitably mounted upon a pair of channel beams 21 and 23 mounted on conventional supports 25 and 27 on rear axle 29. Suitable holes for stakes 60 are provided in the front and rear platforms to retain the loaded poles in place. The fifth wheel assembly 14 may be conventional. Connecting pin 15 extends downwardly from the central I beam 42 to latch therewith. Obviously, other suitable connecting means may be used. The fifth wheel is mounted on platform 70 of the truck cab 12. Also mounted on the platform is compresser 72 and storage tank 74 for the compressed air. Extending from tank 74 is air line 76 with a control valve 78. This line extends through the inner telescoping member 34, through outer member 30, and out through the rear thereof for connection to the reservoirs 80 and 82 for the brakes on the rear platform. The telescoping tubular members can operate as a conduit or sheath due to the extension thereof through the front and rear platforms.

In one form of the invention, the rear platform 18 may be extended away from the front platform without an air motor. This can be done by operating valve 78 to actuate the brakes on only the rear platform, and then driving the cab ahead to draw the front platform and extend the telescoping elements. Pins 90 and 92 are of course removed previously to allow the inner tubular members to slide within the outer members until the rear ends of the inner members are in the position at approximately 100 (see FIG. 1), at which time the pins can be inserted through suitable transverse openings in the tubular elements to lock the trailer in the extended position.

In the preferred form of the invention, a piston-type air motor 102 is mounted between the front platform and rear platform. The cylindrical motor housing is mounted at 104 to the front platform as by weldment, with the end of piston 106 being pivotally attached at 108 to the rear platform 16.

Air line 110 extending from reservoir 74 and controlled by valve 112 extends through tubular conduit 34 forming part of the telescoping means around the fifth wheel assembly to the motor 102. This prevents any damage being caused to the air line by the fifth wheel when the truck turns. With this form of the invention, manipulation of valve 112 to motor 102 enables actuation thereof to push rear platform 18 out behind and away from the front platform to the extended position (not shown). Pins 90 and 92 may be utilized to hold the telescoping members in the extended position as explained above. When the rear platform is extended (or retracted), air line 76 will be protected by the conduit-telescoping member 34. Additionally, if desired, a reel 77 may be provided to automatically rewind the air line 76 as the trailer is contracted. The reel may be spring biased in the wind-up direction.

It will be seen that the extensible, collapsible trailer can be readily extended when reaching the site of the poles to be loaded. After the poles are loaded, they are hauled to the place of unloading, and when unloaded, the trailer is readily retracted merely by operation of valve 112. Further, during the entire hauling operation and during the return for more poles, the rear platform is under constant braking control due to the provision of air brakes thereon. The air lines extending thereto are constantly sheathed to prevent damage.

The inventive structure also enables automatic unloading to be utilized and operated from the common compresser 72 and storage tank 74. A third air line 150, with control valve 152, extends from storage tank 74 to a second and a smaller piston motor 154 (FIG. 3) of the unloader means. This motor 154 includes piston rod 156 slidable under the influence of the air pressure through line 150. The unloading means includes a laterally, generally horizontally positioned tilt bar 160 pivotally mounted at 162 between I beams 42 and 44 on the front platform. The unloader bar may be operably associated to the tilt motor 154 by a suitable linkage such as lever 164 pivotally mounted at 166 and connected to piston 156 at pivotal point 168. Alternatively, motor 154 may be mounted upwardly so that piston rod 156 directly associates with bar 160. Other arrangements are also possible within the broadest aspect of the structure.

By opening valve 152, the entire load of poles may be quickly unloaded by extension of motor 154 to raise the unloader bar 160 as illustrated in phantom in FIG. 3.

It will be obvious from the foregoing description that the pole trailer involved is efficient, rapid, and dependable. The driver, completely unaided, can extend the trailer by opening valve 112 to allow the truck to be loaded, can then drive to the point of unloading, can unload it easily, simply, and rapidly by opening valve 152, and can then contract the trailer by reversing the motor. Instead of utilizing motor 102 to extend and contract the trailer, he may apply the rear brakes and drive the cab forwardly or rearwardly the required amount. At all times the brake lines and tail light lines are protected by the telescoping elements.

It will be obvious to those in the art that the invention illustrated may be modified in various ways without departing from the spirit of the invention. These modifications are deemed to be part of the invention as defined in the claim and the reasonably equivalent structures thereto.

I claim:

An extensible pole trailer comprising a front platform including means to connect said platform to a truck cab; a first pair of tubular elements extending through and secured to said front platform and protruding to the rear thereof; a rear platform mounted upon truck wheel and axle means; a second pair of tubular elements connected to said rear platform and extending forwardly thereof; said second pair of tubular elements being slightly larger in diameter than said first pair whereby said first and second pairs may be telescopically interengaged; at least one set of said pairs of telescopically fitting first and second elements forming a through sheath means; air brake lines for said rear wheels extending through said sheath from said cab to said rear wheels to enable the operation of the brakes thereon; a pressurized fluid cylinder secured between said front and rear platforms below the upper surfaces thereof whereby said trailer may be readily extended and contracted; an elongated member mounted substantially horizontally and laterally on said front platform beneath the pole supporting surface thereof; said member being pivotally connected on one end; an air motor operatively linked to said member to tilt said member about said pivotal connection; pressurized air supply means on said truck cab; air lines leading to each of said motors from said air supply means and to said rear brake means; and valve means for each of said air lines to allow control of said brakes, said elongated cylinder, and said tilt motor to allow simple, rapid control of said pole trailer.

References Cited in the file of this patent

UNITED STATES PATENTS

| | | |
|---|---|---|
| 1,106,104 | Marx | Aug. 4, 1914 |
| 1,419,160 | McKinnon | June 13, 1922 |
| 2,119,800 | Tull | June 7, 1938 |
| 2,301,674 | Andrews et al. | Nov. 10, 1942 |
| 2,321,198 | Graves | June 8, 1943 |
| 2,470,360 | Messick | May 17, 1949 |
| 2,605,113 | Gilmore | July 29, 1952 |
| 2,646,850 | Brown | July 28, 1953 |
| 2,796,266 | Sells | June 18, 1957 |
| 2,901,282 | Meaker | Aug. 25, 1959 |

FOREIGN PATENTS

| | | |
|---|---|---|
| 322,382 | Italy | Nov. 9, 1934 |